Oct. 26, 1971    H. A. FEATHER    3,615,160

TUBE AND SEALED JOINT ASSEMBLY

Filed Nov. 3, 1969

INVENTOR.
Harry A. Feather,
BY John H. Leonard,
his ATTORNEY.

United States Patent Office 3,615,160
Patented Oct. 26, 1971

3,615,160
TUBE AND SEALED JOINT ASSEMBLY
Harry A. Feather, Sarasota, Fla., assignor to
Hynautic, Inc., Nokomis, Fla.
Filed Nov. 3, 1969, Ser. No. 873,355
Int. Cl. F16l 33/00
U.S. Cl. 285—250
9 Claims

ABSTRACT OF THE DISCLOSURE

A body of a hydraulic device has a tube receiving bore with annular wedging, sealing, and seating surfaces, respectively. A deformable plastic tube is embraced by a rigid lock collar and carries a deformable annular seal.

A rigid expanding and reinforcing tapered sleeve is arranged in the tube with a portion protruding from the tube end.

Upon initial insertion of the tube into the bore, the seating area pushes the sleeve farther into the tube and interlocks the tube with the collar, and then the collar engages the wedging surface which fricitonally constrains the collar from rotation. The sleeve progressively expands the tube into tighter sealing relation with the collar without twisting or abrading the tube. An annular seal is in sealed contact with the sealing and seating surfaces and the inner end of the collar.

---

This invention relates to a tube and sealed joint assembly, and particularly to a tube and sealed joint assembly which assures an effective and durable seal, which is compact relative to the diameter of the tube, which can be installed in a bore in a body to provide a sealed joint without the necessity for special equipment or tools, and of which the parts can be readily disassembled and reused. Prior tube and joint assemblies generally comprise a nipple externally threaded for threaded engagement with the bore of the body to which the tube is to be connected. The end portion of the tube is sealed in the bore of the nipple by a suitable externally threaded nut in threaded engagement with an internal thread of the nipple. These assemblies are rather large in comparison to the diameter of the tube. Usually the nuts and nipples have hex heads which must be gripped by suitable wrenches for screwing them into installed position, and the hex head of the nipple must be greater in minimum diameter than the diameter of the nut threaded. Due to clearance requirements for the wrenches between adjacent assemblies combined with the relatively large diameter of the hex head of the nipple, an amount of space disproportionate to the tube size is required for arrangements wherein a number of tubes are to be placed side by side in as close proximity as practical. In fact, the prior fittings present a major problem in connecting a plurality of tubes in close proximity to each other to the body of a relatively small hydraulic device wherein space requirements are at a premium. Furthermore, in prior joint assemblies, the sealing areas are so exposed as to be subject to contamination by foreign matter and metal particles caused or dislodged by the threads during connection. Generally there is rotary abrading and scuffing of the tube by the threaded connecting parts, and twisting of the tube about its axis.

The present assembly is such that the tube receiving bores in the body of a hydraulic device can be located close to each other; for example, slightly more than one diameter spacing between two adjacent tube bores. The center one of three assemblies thus closely spaced side by side can be disassembled without first disconnecting the outer adjacent assemblies to obtain working clearance for a wrench or the fingers. The depth of the cavity required is relatively shallow; for example, approximately one tube diameter plus about 0.025 inch.

Specific features of certain parts of the assembly make possible disassembly of the assembled parts for reuse.

The assemblies are effective both as to sealing and mechanical holding characteristics over a wide range of tube materials ranging from rubbery plastics through stiffer, but yieldable, plastics, such as nylon and Teflon, and ductile metals, such as copper, aluminum, and soft steel. They also remain effective in use when subjected to wide variations in temperatures and pressure, and to rapidly repeated cycles of changes in pressure.

More specific objects are that contaminants on the threads cannot be pushed ahead of the threads into the bore in which the tube is to be sealed, and hence are prevented from contaminating the pressure fluid.

The seal itself is in a chamber which allows for expansion and contraction caused by thermal changes or contact with fluids which cause swelling or contracting of plastic or parts, for volumetric changes of tubing material for similar reasons.

The access of the pressure fluid to the chamber in which the seal is disposed in such as to limit the rate of pressurization and depressurization of the sealed chamber, thus permitting it to accommodate itself to the chamber walls by resilient creeping, thereby eliminating abrasion and wear on the elastomeric seal.

Parts of the assembly can be deformed to assure leakproof joints despite commercial variations in cavity configuration, outside diameter of tubing, outside finishing of tubing, and the like.

The lock collar which backs up the seal has positive contact with the tube and with a wedging wall surface of the bore or cavity in which the tube is installed, and thus prevents extrusion of the seal when the seal is placed under pressure.

The lock collar is held against rotation with the clamping nut and hence cannot twist the tube or abrade it. There is no metal to metal surface contact in the sealed area which can scratch the sealing surfaces during assembly or disassembly.

Various other objects and advantages will become apparent from the following drawings wherein reference is made to the drawings, in which.

Figure 1:
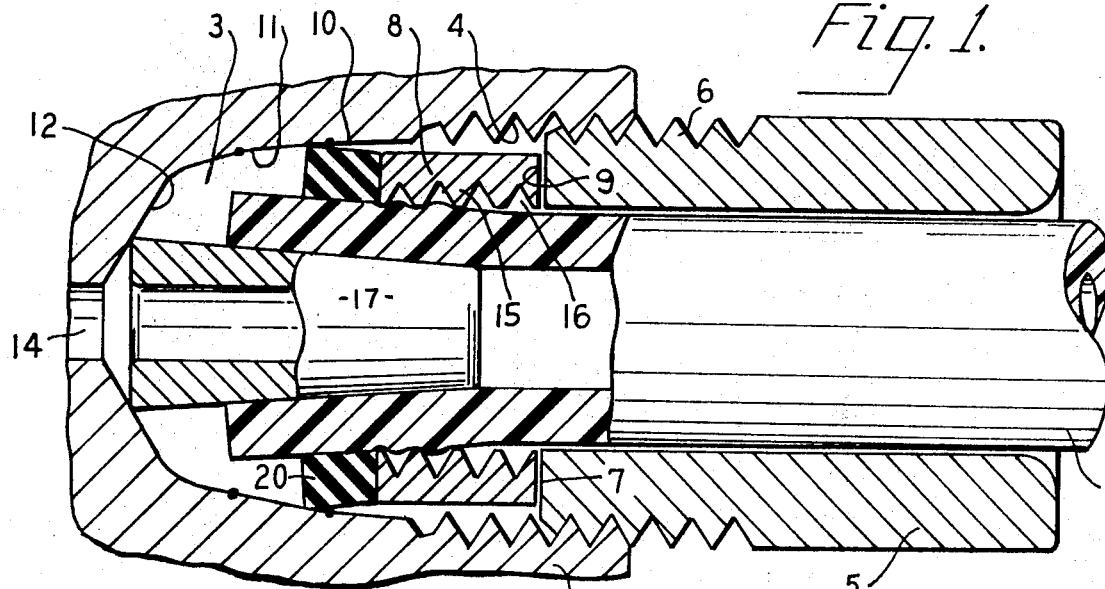
FIG. 1 is an enlarged fragmentary longitudinal sectional view of a tube and sealed joint assembly embodying the present invention, parts thereof being shown in elevation for clearness in illustration, the various elements being shown in their respective positions at the initiation of their installation.

Referring to the drawings, a tube 1 of deformable material is shown as connected to a body 2 of a hydraulic device. The body has a tube receiving bore 3 into which the tube 1 and operating elements of the sealing joint assembly are initially received. The bore 3 is internally threaded, as indicated at 4, for threaded engagement with a clamping nut 5 which is externally threaded, as indicated at 6, preferably with a conventional right-hand thread. Though the nut 5 is shown as externally threaded for engagement with an internal thread in the body bore, the external thread can be provided on the body and the internal thread on the nut.

The nut has an end shoulder 7 which, as the nut is screwed into the bore 3, is disposed within the bore 3. For driving the tube 1 into the bore 3 and for effecting a proper seal, a rigid lock collar 8 is snugly, but slidably, supported on the tube 1 and has at its outer end a shoulder 9 which is engaged by the shoulder 7 of the nut 5 as the nut is screwed into the bore 3, so that the lock collar is driven axially inwardly of the bore 3 by the nut 5.

The bore 3 has an internal annular wall portion providing a wedging surface 10, and contiguous thereto, between the surface 10 and the inner end of the bore, an annular sealing surface 11. Each of these surfaces tapers from the outer end of the bore 3 toward the inner end of the bore at a very small angle to the axis of the bore 3.

If desired, the surfaces 10 and 11 may have the same taper so that the surfaces 10 and 11 form a continuous combined frusto-conical sealing and wedging surface.

Inwardly endwise of the bore 3 from the inner end of the surface 11, the bore wall is shaped to provide an annular frusto-conical seating surface 12 which slopes inwardly generally radially of the bore in a direction toward its innermost end of the surface at an abrupt angle to the axis of the bore so that it faces predominantly toward the outer end of the bore 3. At its inner end the bore 3 is connected with a duct 14 through which fluid is supplied into the interior of the body 2 of the device.

It is desirable that the collar 8 and the tube 1 be interlocked so as to move as a unit as the nut 5 is screwed further into the bore 3 to effect the final assembly. For this purpose, the collar 8 is provided with internal ridges 15 with grooves 16 therebetween and opening inwardly toward the tube.

Figure 2:
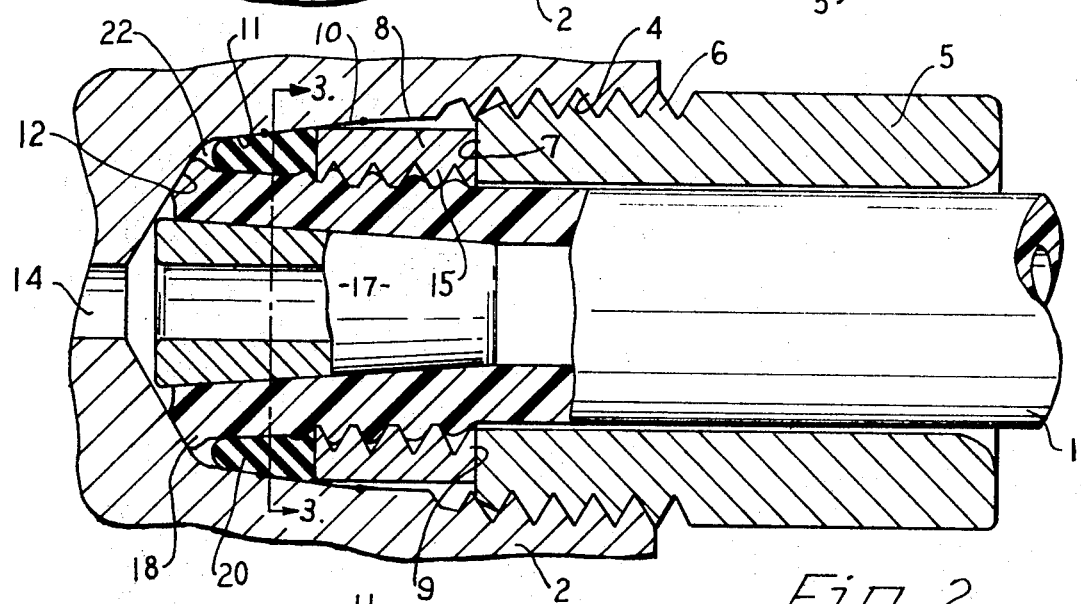
FIG. 2 is a view similar to FIG. 1 showing the tube and assembly with all of the elements in final installed position and is taken on line 2—2 of FIG. 3.
Figure 3:
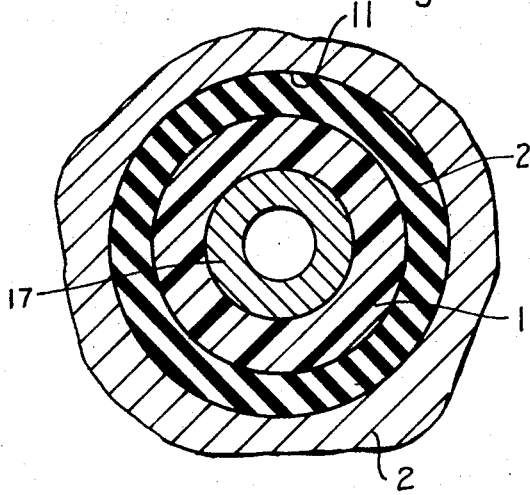
FIG. 3 is a cross sectional view taken on the line 3—3 of FIG. 2.

Since plastic tubes are of relatively soft and highly elastomeric or very readily deformable material, it is necessary that the tube be expanded and internally reinforced so as to effect proper interlocking of the lock collar and tube during installation and to retain a tight sealing engagement between the tube itself and the bore wall. For this purpose, an expanding and reinforcing sleeve 17 is provided. The sleeve 17 is of very rigid material and tapers on its exterior surface in a direction from one end to the other. The sleeve 17 is inserted part way into the inner end of the tube 1 prior to installation of the tube in the bore 3, and is arranged so that its larger diameter end engages the seating surface 12 of the bore wall when the tube is initially disposed in the bore preparatory to operation of the nut 5. As the collar 8 and tube 1 are driven toward the inner end of the bore 3, the sleeve 17 is held fixedly by the surface 12 in a position such that the tube 1 is slid onto the sleeve and is expanded progressively thereby as the inner end of the tube 1 moves toward the larger end of the sleeve 17. Expansion of the tube causes the tube to deform into the grooves or valleys 16, as best illustrated in FIG. 2, and thereby to positively interlock with the collar 8 for travel axially as a unit therewith. By positively interlocking the collar and tube in this manner, extrusion of the tube and scuffing of the tube by the collar are prevented and the collar drives the tube endwise forcibly into the bore 3. This also assures an extremely tight seal between the collar and tube.

The sleeve 17 is preferably a relatively thin metal so that the axial passage therethrough is as near as may be the same as the tube, and does not interfere appreciably with the flow of fluids tthrough the tube.

The lock collar 8 and tube 1 are so arranged that as the nut 5 is screwed into the bore 3 from the position illustrated in FIG. 1, the lock collar 8 initially is moved a short distance axially of the tube 1 until the outer peripheral edge of the inner end of the lock collar 8 strikes the wedging surface 10.

The wedging surface 10, the collar 8, the nut 5 are so related that the binding force engendered by the engagement of the collar with the wedging surface, upon initial axial engagement of the collar and surface 10, imposes on the collar resistance to rotation about its axis greater than the frictional rotational forces or torque between the shoulders 7 and 9. This prevents relative rotation of the collar and tube and precludes twisting of the tube about its axis and also galling and scuffing of the tube. Though the collar may gall the wedging surface, or be galled thereby, during joining of the parts, nevertheless, because of the very slight taper of the surface 10, the collar can be released and withdrawn readily during disassembling.

The seating surface 12 is arranged so that as the tube approaches and reaches final position, its inner end first engages the surface 12 and then is deformed, as indicated at 18, into firm sealing engagement with the surface 12, thereby providing a secondary seal. For this purpose, the spacing of the inner end of the collar 12 from the inner end of the tube must be precise at the time of initial engagement of the collar 6 by the nut 5.

In order to assure an effective primary seal, an annular seal 20, preferably of the O-ring type, of circular or rectangular cross section, and comprised of elastomeric material, is provided. This seal normally is slid onto the end portion of the tube in advance of the lock collar 8 so that as the lock collar and tube advance as a unit into the bore 3, the seal 20 is deformed and compressed about the inner end portion of the tube by engagement with, and movement along, the sealing surface 11 of the bore wall.

In the final installed position, the seal 20 is deformed into effective sealing engagement with the sealing surface 11 of the bore, with the external wall of the tube 1, and with the inner end of the lock collar 8. As a result of this arrangement, during installation, any contamination on, or caused by, the internal threads of the body or nut 5 is prevented from reaching the seal 20 and scoring or scuffing it or the surfaces of the bore wall, and from interfering with the seal or being pushed ahead of the seal into the bore 3, prior to seating of the inner end of the tube 1 on the surface 12, into a position in which it can enter the hydraulic system.

Since the lock collar 8 has a positive engagement with the tube 1 and positive locking engagement with the wedging surface 10 of the bore wall, it is prevented from rotation with the nut 5 and hence cannot twist the tube, or abrade the tube by rotation relative to the tube, during assembly of the joint.

Preferably the ridges 15 are of a shape to provide, in effect, a left-handed thread in the interior of the lock collar 8 so that any tendency of rotation of the lock collar by the nut 5 tends to drive the lock collar in opposition to the nut 5 and thus more effectively prevents it from rotating and from moving axially relative to the tube. This also facilitates removal of the collar from the tube in case of disassembly.

The tube, as mentioned, may be of any suitable ductile material. Conventional plastics, preferably nylon, polyurethane, reinforced plastic rubber, synthetic rubber, deformable metals such as copper, brass, aluminum or soft steel, are very satisfactory. The sleeve 17 is not required with tubes of ductile metal such as copper or soft steel. Instead, in such cases, before insertion of the tube into the body bore, the tube is inserted into the collar and is expanded and deformed by swaging to interlock the tube and collar. The swaging may be accomplished by conventional tools or by driving in a tapered insert.

A distinct advantage of the arrangement in its installed condition is that the chamber, designated 22, defined by the outer wall of the tube 1, the sealing surface 11, and inner end of the lock collar 8, and the seating surface 12, can communicate with the internal duct 14 only by passing between the inner deformed end of the tube 1 and the seating area 12, as at 18. Even if this particular seal at the deformed end of the tube is not sufficient to withstand the highest pressures, it is sufficient to dampen their effect and cause any pressure build up and reduction in the chamber 22 to be more gradual. As a result of this secondary sealing effect at 18, the seal 20 is not shifted rapidly, but adjusts and accommodates itself to the chamber walls by elastic deformation and creepage, whereby wear and loosening of the seal are prevented.

In the case of plastic tubes, the installation can be made and rendered pressure tight by turning the nut 5 with the fingers. In fact, a joint capable of sealing relatively high pressures can be effected without the necessity of any tools. However, for extremely tight fits, and in the case of ductile metal tubes, an ordinary hand wrench can be used for tightening the nut 5.

From the above description it is apparent that the joint can readily be disassembled merely by unscrewing the nut 5 and pulling the tube with the lock collar 8 and sleeve 21, both secured to the tube 1, out of the bore 3. No nipples are required.

The seal 20 may be unconnected to the tube, lock collar, or body, except by pressure and frictional engagement therewith in the installed position, or it may be bonded or vulcanized onto the collar 8. The seal can readily be disassembled from the tube as also can the sleeve 21, and they can be reassembled on a new tube.

There are no metal to metal contacts in the seal area which could scratch the sealing surface during installation. Since the access of pressure fluid to the chamber 22 is limited by the deformed end portion of the tube at 18, the seal 20 is not subjected to rapidly succeeding changes to and from positive and negative pressures which could cause malfunctioning of the seal.

Having thus described my invention, I claim:

1. A tube and sealed joint assembly comprising:
a body having a tube receiving and connecting bore;
the bore having a wall with an internal annular wedging surface and a sealing surface, both of which surfaces taper toward the inner end of the bore;
a tube of deformable material and having an end portion within and coaxial with the bore;
a rigid annular locking collar embracing the tube and in interlocking relation thereto at a location spaced from the inner end of the tube;
a resilient annular seal embracing the tube between the inner end of the collar and inner end of the tube and in sealing relation with the wall of the tube, with said sealing surface, and with the inner end of the collar;
a compression member detachably connected to the body and operable to drive the locking collar to, and hold it fixedly in, said location endwise of the bore, and
a rigid reinforcing sleeve in tightly wedged relation in the tube and having a portion extending for the entire length of the seal and collar in the assembled position of the joint.

2. The structure according to claim 1 wherein the compression member has a shoulder which bears against a shoulder on the collar which faces outwardly of the body bore and the wedging surface has an angle of incidence such that upon driving the collar axially inwardly of the body bore by the compression member the wedging surface engages the edge of the inner end of the collar sufficiently tightly to constrain the collar from rotation about its axis by frictional rotative forces imposed on the collar by rotation of the compression member as the collar is driven inwardly of the body bore by the member.

3. The structure according to claim 1 wherein the tube is formed of elastomeric material.

4. The structure according to claim 1 wherein the outer surface of said sleeve is tapered slightly from the end innermost in the body bore toward its other end.

5. The structure according to claim 4 wherein the bore wall has an annular seating surface disposed inwardly endwise of the bore from the said sealing surface and extending inwardly radially of the bore at an abrupt angle to the axis of the bore; and
said inner end of the tube is deformed into firm seating relation with said annular seating surface so as to at least dampen the fluctuations in fluid pressure in the space in which the annular seal is exposed.

6. The structure according to claim 5 wherein said other end of the sleeve bears against said annular seating surface at a location radially inwardly from the engaged end of the tube.

7. The structure according to claim 1 wherein the detachable connection between the compression member and body are complementary screw threads on the body and member coaxial with the bore; and
the member has an annular portion surrounding the tube and projecting into the bore and engaging the outer end of the locking collar.

8. The structure according to claim 1 wherein the locking collar has internal ridges extending radially inwardly, and has inwardly opening grooves between the ridges, and said tube is deformed radially into said grooves.

9. The structure according to claim 8 wherein the ridges are in the form of a left-hand thread.

References Cited

UNITED STATES PATENTS

| | | | |
|---|---|---|---|
| 1,851,143 | 3/1932 | Wilson | 285—382.7 X |
| 2,761,704 | 9/1956 | Crawford | 285—382.7 X |
| 3,275,350 | 9/1966 | Kody et al. | 285—382.7 X |
| 3,485,517 | 12/1969 | Howe | 285—382.7 X |

FOREIGN PATENTS

| | | | |
|---|---|---|---|
| 801,859 | 9/1958 | Great Britain | 285—250 |
| 678,423 | 12/1964 | Italy | 285—343 |
| 300,915 | 5/1968 | Sweden | 285—343 |

DAVE W. AROLA, Primary Examiner

U.S. Cl. X.R.

285—334.5, 348, 351